March 8, 1938.  A. KINGSBURY  2,110,464
THRUST BEARING
Filed Aug. 4, 1936  2 Sheets-Sheet 2

Inventor
Albert Kingsbury
By Cameron, Kerkam & Sutton
Attorneys

Patented Mar. 8, 1938

2,110,464

UNITED STATES PATENT OFFICE 2,110,464

THRUST BEARING

Albert Kingsbury, Greenwich, Conn., assignor to Kingsbury Machine Works, Inc., Philadelphia, Pa., a corporation of Delaware Application August 4, 1936, Serial No. 94,260

28 Claims. (Cl. 308—160)

This invention relates to thrust bearings, and more particularly to thrust bearings of the type employing a plurality of tiltably mounted bearing shoes associated with means for automatically equalizing the pressure on the several shoes.

In my prior Patent No. 1,421,695, granted July 4, 1922, for Bearings, I have disclosed an equalizing structure comprising a series of bridged equalizing plates, preferably formed by cutting the same as complementary sections from a ring or ring segment, said plates having rollers, disposed between the overlapping portions thereof, which also function to retain the plates in their proper circumferential relationship by engagement in apertures in the wall of a channel-shaped cage ring. It is an object of this invention to provide a thrust bearing with an improved equalizing means of the type employing a bridged series of equalizing plates having roller bearing elements disposed between the overlapping portions of said plates.

Another object of this invention is to provide equalizing means of the type characterized which, by reason of its construction and manner of operation, minimizes the wear of the roller elements employed, to the end that said equalizing means will withstand a long period of service even though the conditions of service are such as to cause movement of each equalizing plate during each rotation of the shaft.

Another object of this invention is to provide equalizing means of the type employing a bridged series of equalizing plates which is relatively stable, both when the load is on the bearing and when the load is removed from the bearing, to the end that all danger of an equalizing plate tipping from its proper position and failing to function is eliminated.

Another object of this invention is to provide equalizing means of the type just characterized which is sensitively responsive to fluctuations of pressure, to the end that substantial equalization of pressure is maintained between the several bearing shoes supported by said equalizing means, and which at the same time is so constructed that the parts tend to promptly resume a normal position upon removal of any unbalanced force tending to move the parts out of normal position.

Another object of this invention is to provide an equalizing means of the type employing a bridged series of equalizing plates wherein the supporting plates of the bridged series are so mounted that they tend to assume a position parallel to the surface upon which they are supported by reason of their own weight or any pressure thereagainst and therefore return to such position immediately that the load is withdrawn from the bearing if, in the equitable distribution of pressure caused by such load, said supporting plates are moved out of such position.

Another object of this invention is to provide equalizing means of the type just characterized wherein the supporting plates of the bridged series are so mounted that they will not tip over when the load is removed from the bearing and thereby possibly interfere with their proper functioning when the load is restored to the bearing.

Another object of this invention is to provide equalizing means of the type characterized which is so constructed as to be strong and durable, and yet relatively simple and compact, to the end that with minimum consumption of space a highly efficient and sensitive equalization of pressure can be obtained between the respective shoes of the bearing.

Other objects will appear as the description of the invention proceeds.

The invention is capable of receiving a variety of mechanical expressions, one of which is shown on the accompanying drawings, but it is to be expressly understood that the drawings are for purposes of illustration only, and are not to be construed as a definition of the limits of the invention, reference being had to the appended claims for that purpose.

Referring in detail to the drawings, wherein like reference characters are employed to designate corresponding parts in the several figures,—

Figure 2:
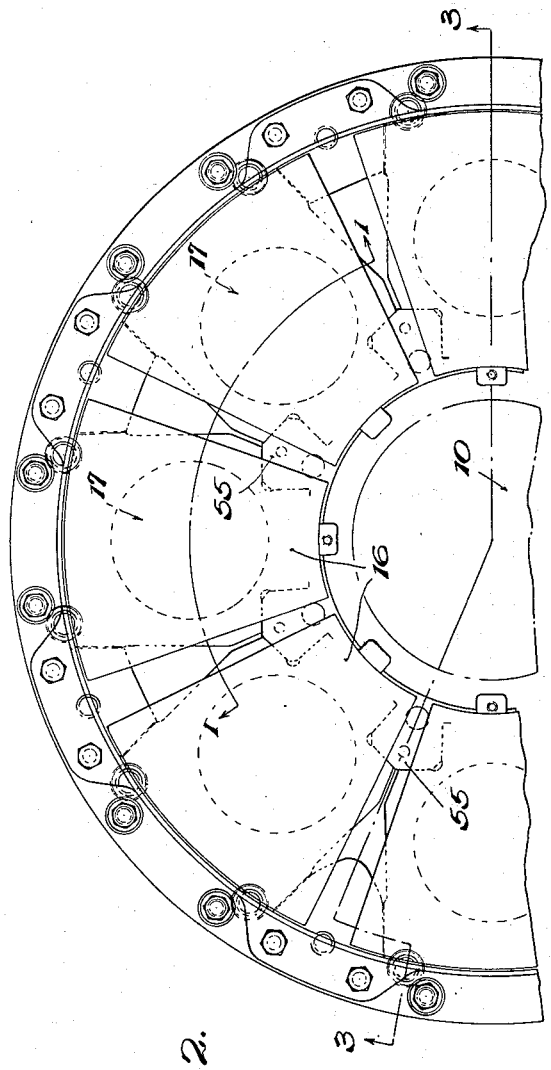
Fig. 2 is a fragmentary plan view, on a smaller scale, of said embodiment of the invention.
Figure 3:
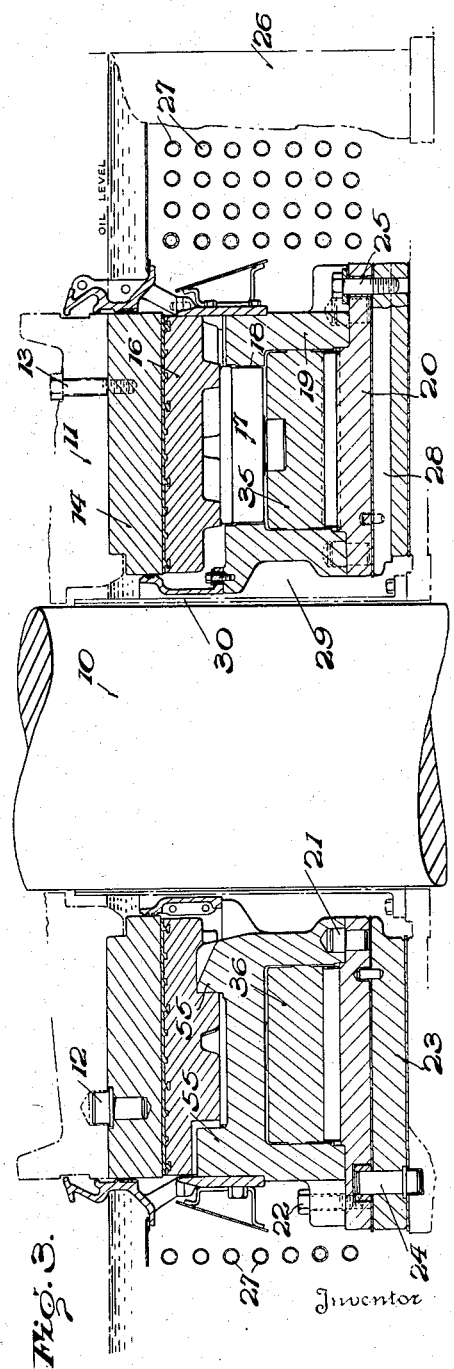
Fig. 3 is an axial section on the line 3—3 of Fig. 2.

Referring first to Figs. 2 and 3, shaft 10, which may be a vertical, inclined or horizontal shaft and associated with any suitable machine or mechanism, has mounted thereon or attached thereto in any suitable way a thrust block 11 to which is suitably attached, as by dowels 12 and bolts 13, a runner 14 provided with a bearing surface of any suitable character. Cooperating with said bearing surface are a plurality of bearing members or shoes 16, of any suitable number, size and construction, supported upon equalizing means of the present invention. While each shoe 16 may be supported by said equalizing means in any suitable way, as here shown each shoe is mounted upon a block 17 positioned in an aperture 18 in the wall of an inverted U-shaped or channel-shaped cage ring 19 closed at its open side by a base plate 20, attached to said cage ring against relative displacement by dowel pins 21 and bolts 22 at either or both sides of the channel-shaped cage ring. Base ring 20 is mounted on a sub-base ring 23 and relative rotation therebetween is prevented by dowels 24 and bolts 25.

The entire bearing structure, as shown, is mounted in an oil well 26 of any suitable size and construction, and here shown as provided interiorly thereof with a suitable cooling coil 27. Oil may circulate from the outer portion of the oil well through suitable passages 28, here shown as formed in the sub-base ring, to the space 29 between the inner guard wall 30 and the inner periphery of the bearing elements, and thence to and between the bearing shoes to form suitable wedge-shaped oil films between said bearing shoes and the bearing surface of the runner 14 in conformity with the principle of the Kingsbury bearing as well understood in the art.

In conformity with the present invention said equalizing means is composed of a bridged series of equalizing plates 35 and 36 respectively provided with oppositely facing lateral flanges 37 and 38 between which are disposed roller bearing elements or pins 39, and therefore of the general type disclosed in my patent above identified, but here the pins 39 are restricted in length to approximately the radial width of the equalizing plates and therefore do not extend into apertures in the cage ring as in my earlier patent. Alternate plates of said series, i. e., those designated 36, are mounted as hereinafter explained on the base ring 20 so as to provide a tiltable support for said plates 36, while the intermediate plates, i. e., those designated 35, constitute supports for the bearing shoes 16 through the intermediary of the blocks 17. As here shown, each block is preferably mounted to tilt with respect to its associated plate 35, and to that end each of said plates 35 is shown as provided with a hardened insert 40 having a spherically curved or rocker surface 40' which is engaged with the rear face of the associated block 17 or with the face of a hardened insert mounted therein.

In place of mounting each of the plates 36 on a single pivotal or rocker support as in my earlier patent above identified, I mount each of said plates 36 upon a pair of roller bearing elements or pins 41 and 42, said pins being disposed symmetrically with respect to and on opposite sides of the medial radial plane of said plate and parallel to said plane. Thereby each plate 36 is supported by a pair of roller elements symmetrically disposed with respect to and parallel to the radial plane through the center of gravity of said plate, whereby each plate is thus given stability because of its two lines of support respectively on opposite sides of the radial plane through its center of gravity.

Figure 1:
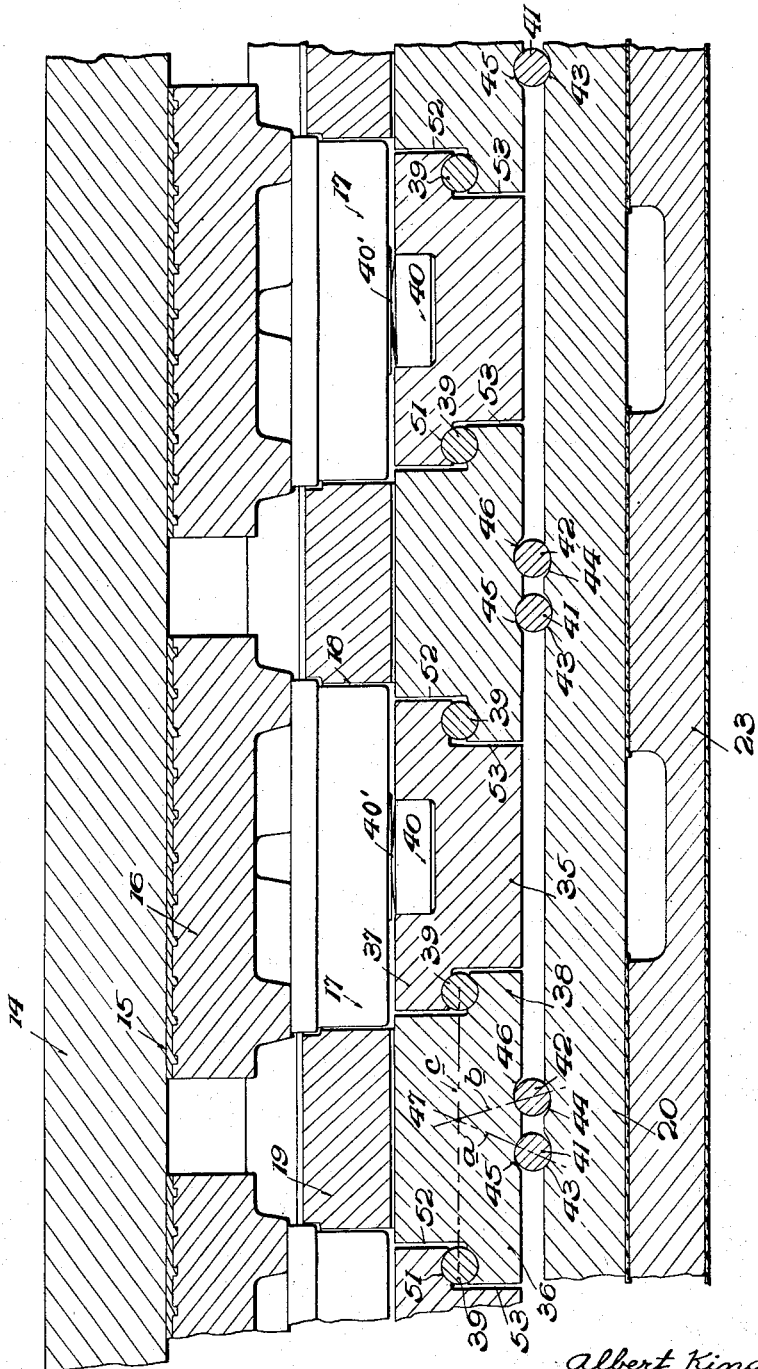
Fig. 1 is a fragmentary diagrammatic section on the line 1—1 of Fig. 2 developed into a single plane and showing an equalizing means with associated parts embodying the present invention.

Each of said pins 41 and 42 is positioned in a groove, 43 and 44, respectively, in the base plate 20, and in a groove, 45 and 46, respectively, in plate 36, but each of said grooves has a radius of curvature which is somewhat larger than the radius of curvature of the associated pin, and opposed grooves, 43 and 45 on the one hand and 44 and 46 on the other hand, have their centers of curvature slightly displaced circumferentially with respect to each other so that in any cross section the two opposed grooves do not lie in the same circle although having the same radius of curvature. As a result of the manner in which these grooves are thus formed, explained more fully hereinafter, the radial plane passing through the lines of contact of pin 41 with the walls of grooves 43 and 45 (see dotted line a in Fig. 1) intersects the radial plane passing through the lines of contact of pin 42 with the walls of the grooves 44 and 46 (see dotted line b in Fig. 1) in the medial radial plane of the plate 36 and also in the plane passing through the centers of the two pins 39 cooperating with said plate 36 (see dotted line c in Fig. 1). Thus the radial line 47 which constitutes the line of intersection of said two planes designated a and b becomes an instantaneous center about which plate 36 will move if the load thereon in the direction of the axis of the shaft becomes unbalanced as between the two circumferential extremities of said plate.

As the two pins 39 lie in the same plane with said instantaneous center 47 any movement of the plate 36 about its instantaneous center produces a movement at the pins 39 which is substantially at right angles to the plane designated c connecting said pins 39, i. e., there is substantially no relative movement in a circumferential direction between the overlapping portions of the plates 35 and 36 at the pins 39. On the other hand, movement of plate 36 about said instantaneous center is accompanied by a rolling of either the pin 41 or the pin 42, depending upon the direction of movement, up the inclined surface of the outer wall of its corresponding groove 43 or 44 and the rolling of the other pin toward the center of its corresponding groove, so that the instantaneous center is both displaced laterally with respect to its normal position and also slightly displaced toward the thrust collar with respect to its normal position. This is a position of instability, and the plate 36 will remain in this position only so long as there is an unbalanced load holding the same therein. Therefore, immediately that the unbalanced load is removed from the plate 36, plate 36 will resume its normal position of stability, i. e., the position illustrated in Fig. 1 with the plate 36 parallel to the base plate. Thus the plate 36 is so mounted that it cannot move about its pivotal support until one end or the other engages the base plate, as might occur if said plate had a single knife edge or rocking support, and hence there is no danger that, if the load is removed from the bearing, said plate 36 will assume a position that may render it incapable of performing its intended function when the load is subsequently restored to the bearing. In a vertical bearing the position of stability as above explained is one which the plate 36 will assume by reason of its own gravity. Therefore as soon as any unbalancing load is withdrawn from the plate 36 said plate will resume its position of stability, but at the same time it is at all times free to respond to any unbalanced load and tilt to the extent required for effecting the redistribution of pressure and equalization of the load upon the bearing shoes.

The spacing between the pins 41 and 42 and the radius of curvature of the respective grooves with respect to the pins positioned therein may be varied to conform with the amount of equalizing movement desired. Thus the construction heretofore described affords considerable flexibility in the design of the equalizing means. Also the instantaneous center about which plate 36 moves can be varied, so as to be located either above or below the plane passing through the centers of the pins 39, by so forming said grooves that the planes through the lines of contact of the pins therewith will intersect at the desired instantaneous center, following the principle heretofore explained.

In constructing a bearing in conformity with the present invention the plates 35 and 36 are preferably cut from a complete ring, or a complete segment of a ring (if the bearing occupies less than a complete circumference), after the grooves 43, 44, 45 and 46 for the pins have been formed in said ring and in the base plate 20 when the parts are in assembled relation. The difference between the radius of curvature for the grooves and the radius of curvature of the pins is chosen with regard to the amount of displacement desired to effect the designed operation of the leveling plates, the smaller the difference between said radii of curvature the less the range through which said plates can move to effect equalization, as will be apparent.

The ring from which the leveling plates are to be formed and the base plate 20 are first assembled in concentric parallel relationship but with a distance between the two which is greater than that to exist when the parts are in normal assembled relation in the completed bearing, the amount of this excess spacing depending upon the difference in radius of curvature to be used for the grooves and the radius of curvature of the pins. The leveling plate ring is then shifted laterally (out of concentricity), to the right for making the left-hand grooves, and a boring bar is shifted an equal amount to the left from its mean position and said bar then used to form the grooves 43 and 45 along a line parallel to the radial medial plane of the plate 36. Then the leveling plate ring is shifted as much to the left of the mean position and the boring bar is shifted as much to the right of its mean position to form the right-hand grooves. The lateral shifts of the leveling plate ring are made at right angles to the radial medial plane of the plate 36 in order that the grooves formed by the boring bar shall be parallel to said plane. After one pair of parallel borings is thus made the leveling plate ring and the base plate together are rotated in concentric relation until the next mean position of a plate 36 is reached, and then the leveling plate ring is again shifted the predetermined amount to the right and the boring bar is shifted the predetermined amount to the left from their medial positions to form the left-hand grooves. Then the leveling plate ring is again shifted to the left of its medial position and the boring bar to the right of its medial position to make the right-hand grooves. This is repeated until all the pairs of grooves for the pins 41 and 42 associated with the plates 36 have been formed.

Thereby each opposing pair of grooves are formed as arcs of the same radius of curvature when the leveling plate ring and the base plate are spaced apart a distance in excess of that which will exist in normal assembled relationship, but each pair of opposed grooves are in concentric relationship only when the other pair of opposed grooves are out of concentric relationship. Hence when the leveling plate ring is assembled with the base ring and the spacing thereof is determined by the diameter of the pins 41 and 42, said pins, by cooperating with the opposed pair of grooves, assume a position wherein each pin has line contact with the outer wall of its groove in the base plate and line contact with the inner wall of its groove in the leveling plate ring, with the two planes through the two lines of contact of each pin intersecting at the selected instantaneous center of rotation for the plate 36 to be cut from said ring. As will be apparent the amount of lateral shift from medial position of the leveling plate ring and of the boring bar in making the grooves as before described will depend upon the radius of curvature selected for the grooves and the location of the two planes which are to intersect the two lines of contact of each pin with its opposed grooves, while said planes are themselves determined by the selected location of the instantaneous center and the selected spacing which is to exist between the centers of the two pins 41 and 42 under normal conditions.

The leveling plate ring is then suitably drilled to provide the apertures 51 for the pins 39, and the leveling plate ring is next cut into sections to form the plates 35 and 36 by saw cuts 52 and 53 that preferably extend parallel to the medial radial plane of each plate and break tangentially into the drilled hole 51 as shown. The holes 51 for the pins 39 can be of substantially the same diameter as the pins 39 because of the relative direction of movement and absence of rolling of the pins in a circumferential direction as heretofore explained. However, pins 39 may be made in sections, for example three sections to each pin, if, due to the radial extent of said pins, there is an undue tendency for the pins to twist when equalizing movement of the plates occurs during the operation of the bearing. Pins 41 and 42 may also be made in sections, if preferred as a matter of convenience in handling or grinding, and the same reasons may dictate the forming of pins 39 in sections even though no substantial tendency to twist may exist.

The leveling plate ring and the base ring should be made of durable material, and therefore are preferably made of forged steel, which is also conducive to accuracy in boring. The cage ring 19 does not take any of the thrust load, and therefore it may be made of cast iron, for example. To facilitate assembly said cage ring is shown as of inverted U-shape or channel-shape, so that it can be assembled over the leveling plates after they are in place—or the leveling plates may be assembled in inverted relationship in the channel of the ring 19 and the base plate 20 may be bolted thereto before turning the parts upside down into their normal relationships. The cage so formed for the leveling plates also holds the blocks 17 in proper position in the apertures 18 formed therein, and relative circumferential displacement of the leveling plates and base plate is prevented, except for the equalizing movement as heretofore explained, by reasons of the pairs of pins 41 and 42 located in opposed grooves in the leveling plates and base ring.

The cage ring 19 may also be provided with suitable lugs, as shown at 55 in Fig. 3, to retain the bearing members 16 in their proper circumferential position, said lugs receiving the circumferential frictional force that tends to displace the shoes circumferentially during starting or stopping. For this latter reason said cage ring 19 must be securely held in position, and to this end it is preferably both bolted and doweled to the base plate as heretofore described.

As the leveling plates are thus disposed in a channel-shaped cavity close to the base plate 20 and have openings only at the apertures 18 which are substantially filled by the blocks 17, lubricating oil may fill the cavities in the channel-shaped cage ring, and inasmuch as oil may escape from this channel-shaped ring only through the confined passages between the peripheries of the blocks 17 and the apertures 18, the confined leveling plates may function somewhat as a dash pot tending to dampen the vibration if there is any tendency to set up a vibratory movement.

It will thus be perceived that a simple, compact and highly efficient equalizing means has been provided. The equalizing plates 35 and 36 are free to tilt circumferentially in accordance with the principle of operation of the bridged series of equalizing plates heretofore invented by me. In order to correct such errors as exist in squaring up the thrust deck with the shaft or which result from tolerances in the bearing measurements, only relatively slight displacement of the equalizing plates is required. However, the amount of such displacement may vary considerably between different installations, depending upon the size of the bearing, permissible tolerances and other reasons. The present invention takes advantage of the known small displacement required for the equalizing plates and, while affording considerable flexibility in predetermining the amount of such displacement permitted, increases the stability and durability of said equalizing means.

Each plate 36 tends to lie parallel to the base plate 20, whether acted upon by its own weight only or also by the load on the bearing. While the equalizing plates are free to move and effect their equalizing function within predetermined limits as fixed by the construction, as soon as any unbalanced force is removed said plates at once return to their normal position because of the stability afforded by the use of two rollers for supporting each plate 36 and the lack of concentricity of the grooves in which said rollers are disposed. At the same time the durability of the structure has been materially increased because, even though it be assumed that each leveling plate must rock once for each revolution of the shaft, the rolling between the pins and the equalizing plates has been kept to a minimum at the pins 39 by use of a construction wherein a minimum of relative displacement occurs at said pins, while the presence of two rollers supporting each plate 36 compensates to a large extent for the larger amount of rolling displacement which exists between each of said rollers and its contacting surfaces. Hence experience has demonstrated that wear at the roller elements is kept to a minimum.

While the embodiment of the invention illustrated on the drawings has been described with considerable particularity, it is to be expressly understood that the invention is not restricted thereto, as the invention is capable of receiving a variety of mechanical expressions, some of which will now readily suggest themselves to those skilled in the art, while changes may be made in the details of construction, arrangement, proportion, material, etc., without departing from the spirit of this invention. It is to be expressly understood that the invention may be embodied in bearings having a complete circumferential series of equalizing members or one having only a segmental series of equalizing members where the bearing members occupy less than a complete circumference of the bearing, and that the equalizing means of the present invention may be used in conjunction not only with bearings for vertical shafts but also with bearings for horizontal or inclined shafts. It is also to be expressly understood that the invention may be used with any suitable number of bearing shoes, and said shoes may be constructed and supported in any suitable way. Certain features of the invention may also be used without other features of the invention. Therefore reference is to be had to the appended claims for a definition of the invention.

What is claimed is:

1. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, and means for tiltably mounting each of said intermediate equalizing plates comprising a pair of roller bearing elements disposed in opposed grooves in said equalizing plate and said base plate.

2. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, and means for tiltably mounting each of said intermediate equalizing plates on said base plate comprising a pair of roller bearing elements disposed on opposite sides of the medial radial plane of said equalizing plate.

3. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, and means for tiltably mounting each of said intermediate equalizing plates on said base plate comprising a pair of roller bearing elements disposed on opposite sides of the medial radial plane of said equalizing plate and providing an instantaneous center of rotation therefor.

4. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, and means for tiltably mounting each of said intermediate equalizing plates on said base plate comprising a pair of parallel roller bearing elements disposed in opposed grooves in said equalizing plate and said base plate on opposite sides of the medial radial plane of said equalizing plate and providing an instantaneous center of rotation therefor.

5. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, and means for tiltably mounting each of said intermediate equalizing plates comprising a pair of parallel roller bearing elements located between said plate and said base plate and cooperating with opposed grooves to provide for tilting of said equalizing plate, said roller bearing elements being disposed symmetrically with respect to the medial radial plane of said equalizing plate.

6. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, and means for tiltably mounting each of said intermediate equalizing plates comprising a pair of parallel roller bearing elements disposed in opposed eccentric grooves in said equalizing plate and said base plate and disposed symmetrically with respect to the medial radial plane of said equalizing plate.

7. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, and means for tiltably mounting each of said intermediate equalizing plates comprising a pair of roller bearing elements disposed in opposed grooves in said equalizing plate and said base plate, said opposed grooves being non-concentric and having a radius of curvature in excess of the radius of curvature of said roller bearing elements.

8. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, and means for tiltably mounting each of said intermediate equalizing plates comprising a pair of roller bearing elements disposed in opposed grooves in said equalizing plate and said base plate and normally held therein so that the planes through the lines of contact of said roller bearing elements with the walls of said grooves intersect in the medial radial plane of said equalizing plate.

9. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, roller bearing elements interposed between the overlapping ends of said equalizing plates, and means for tiltably mounting each of said intermediate equalizing plates comprising a pair of roller bearing elements disposed in opposed grooves in said equalizing plate and said base plate and normally held therein so that the planes through the lines of contact of said roller bearing elements with the walls of said grooves intersect in the medial radial plane of said equalizing plate, said intersection also lying in the plane joining the centers of the roller bearing elements interposed between said equalizing plate and the adjacent equalizing plates.

10. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, and means for tiltably mounting each of said intermediate equalizing plates comprising a pair of roller bearing elements disposed in opposed grooves in said equalizing plate and said base plate, said grooves being so formed as to hold said roller bearing elements against the outer walls of said grooves in the base plate and against the inner walls of said grooves in the equalizing plate.

11. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, and means for tiltably mounting each of said intermediate equalizing plates comprising a pair of roller bearing elements disposed in opposed grooves in said equalizing plate and said base plate and providing an instantaneous center of rotation for said equalizing plate which lies in the medial radial plane of said equalizing plate.

12. In a thrust bearing, a plurality of thrust bearing members, means for equalizing the bearing pressure thereon and a base plate on which said equalizing means is mounted, said equalizing means comprising equalizing plates on which said bearing members are mounted, intermediate equalizing plates bridged by said first named equalizing plates and on which said first named equalizing plates are mounted to form therewith a circumferentially flexible equalizing structure, roller bearing elements interposed between the overlapping ends of said equalizing plates, and means for tiltably mounting each of said intermediate equalizing plates comprising a pair of roller bearing elements disposed in opposed grooves in said equalizing plate and said base plate and providing an instantaneous center of rotation for said equalizing plate which lies in the medial radial plane of said equalizing plate and in a plane connecting the centers of the roller bearing elements interposed between said equalizing plate and the adjacent equalizing plates.

13. In a thrust bearing, a plurality of thrust bearing members, means for equalizing the pressure on said bearing members and a base plate on which said equalizing means is mounted, said equalizing means comprising a plurality of equalizing plates on which the respective bearing members are mounted, a plurality of intermediate equalizing plates bridged by said first named equalizing plates and on which said first named equalizing plates are mounted to form therewith a circumferentially flexible equalizing structure, roller bearing elements disposed between the adjacent ends of contiguous equalizing plates, and means for tiltably mounting each of said intermediate equalizing plates comprising a pair of roller bearing elements disposed in opposed grooves in said intermediate plate and said base plate and providing an instantaneous center of rotation which lies in the plane connecting the centers of the roller bearing elements interposed between said equalizing plate and the adjacent equalizing plates.

14. In a thrust bearing, a plurality of thrust bearing members, means for equalizing the pressure on said bearing members and a base plate on which said equalizing means is mounted, said equalizing means comprising a plurality of equalizing plates on which the respective bearing members are mounted, a plurality of intermediate equalizing plates bridged by said first named equalizing plates and on which said first named equalizing plates are mounted to form therewith a circumferentially flexible equalizing structure, roller bearing elements disposed between the adjacent ends of contiguous equalizing plates, and means for tiltably mounting each of said intermediate equalizing plates comprising a pair of roller bearing elements disposed in opposed grooves in said equalizing plate and said base plate and providing an instantaneous center of rotation for said equalizing plate.

15. In a thrust bearing, a plurality of thrust bearing members, means for equalizing the pressure on said bearing members and a base plate on which said equalizing means is mounted, said equalizing means comprising a plurality of equalizing plates on which the respective bearing members are mounted, a plurality of intermediate equalizing plates bridged by said first named equalizing plates and on which said first named equalizing plates are mounted to form therewith a circumferentially flexible equalizing structure, roller bearing elements disposed between the adjacent ends of contiguous equalizing plates, and means for tiltably mounting each of said intermediate equalizing plates comprising a pair of parallel roller bearing elements disposed between said equalizing plate and said base plate in opposed grooves located on opposite sides of the medial radial plane of said equalizing plate, each pair of opposed grooves having their centers laterally displaced with respect to each other.

16. In a thrust bearing, a plurality of thrust bearing members, means for equalizing the pressure on said bearing members and a base plate on which said equalizing means is mounted, said equalizing means comprising a plurality of equalizing plates on which the respective bearing members are mounted, a plurality of intermediate equalizing plates bridged by said first named equalizing plates and on which said first named equalizing plates are mounted to form therewith a circumferentially flexible equalizing structure, roller bearing elements disposed between the adjacent ends of contiguous equalizing plates, and means for tiltably mounting each of said intermediate equalizing plates comprising a pair of roller bearing elements disposed in opposed grooves in said equalizing plate and said base plate, each of said grooves having a radius of curvature which is greater than the radius of curvature of its associated roller bearing element and the opposed grooves associated with each roller bearing element being eccentric.

17. In a thrust bearing, a plurality of thrust bearing members, means for equalizing the pressure on said bearing members and a base plate on which said equalizing means is mounted, said equalizing means comprising a plurality of equalizing plates on which the respective bearing members are mounted, a plurality of intermediate equalizing plates bridged by said first named equalizing plates and on which said first named equalizing plates are mounted to form therewith a circumferentially flexible equalizing structure, roller bearing elements disposed between the adjacent ends of contiguous equalizing plates, and means for tiltably mounting each of said intermediate equalizing plates comprising a pair of roller bearing elements disposed in opposed grooves in said equalizing plate and said base plate and providing an instantaneous center of rotation for said equalizing plate which lies in the medial radial plane thereof.

18. In a thrust bearing, a plurality of thrust bearing members, means for equalizing the pressure on said bearing members and a base plate on which said equalizing means is mounted, said equalizing means comprising a plurality of equalizing plates on which the respective bearing members are mounted, a plurality of intermediate equalizing plates bridged by said first named equalizing plates and on which said first named equalizing plates are mounted to form therewith a circumferentially flexible equalizing structure, roller bearing elements disposed between the adjacent ends of contiguous equalizing plates, and means for tiltably mounting each of said intermediate equalizing plates comprising a pair of roller bearing elements disposed in opposed grooves in said equalizing plate and said base plate, said grooves and roller bearing elements cooperating to effect tilting of said equalizing plate upon lateral displacement of said roller bearing elements in said grooves.

19. In a thrust bearing, a plurality of thrust bearing members, means for equalizing the pressure on said bearing members and a base plate on which said equalizing means is mounted, said equalizing means comprising a plurality of equalizing plates on which the respective bearing members are mounted, a plurality of intermediate equalizing plates bridged by said first named equalizing plates and on which said first named equalizing plates are mounted to form therewith a circumferentially flexible equalizing structure, roller bearing elements disposed between the adjacent ends of contiguous equalizing plates, and means for tiltably mounting each of said intermediate equalizing plates comprising a pair of roller bearing elements disposed in opposed grooves in said equalizing plate and said base plate, each of the grooves in said base plate having its center of curvature nearer the medial radial plane of said equalizing plate than is the center of curvature of the corresponding grooves in said equalizing plate.

20. In a thrust bearing, a plurality of thrust bearing members, means for equalizing the pressure on said bearing members and a base plate on which said equalizing means is mounted, said equalizing means comprising a plurality of equalizing plates on which the respective bearing members are mounted, a plurality of intermediate equalizing plates bridged by said first named equalizing plates and on which said first named equalizing plates are mounted to form therewith a circumferentially flexible equalizing structure, roller bearing elements disposed between the adjacent ends of contiguous equalizing plates, and means for tiltably mounting each of said intermediate equalizing plates comprising a pair of roller bearing elements disposed in opposed grooves in said equalizing plate and said base plate, each of said roller bearing elements being held in contact with the outer wall of the corresponding groove in said base plate and in contact with the inner wall of the corresponding groove in said equalizing plate.

21. In a thrust bearing, a plurality of thrust bearing members, means for equalizing the pressure on said bearing members and a base plate on which said equalizing means is mounted, said equalizing means comprising a plurality of equalizing plates on which the respective bearing members are mounted, a plurality of intermediate equalizing plates bridged by said first named equalizing plates and on which said first named equalizing plates are mounted to form therewith a circumferentially flexible equalizing structure, roller bearing elements disposed between the adjacent ends of contiguous equalizing plates, and means for tiltably mounting each of said intermediate equalizing plates comprising a pair of roller bearing elements held in opposed grooves in said equalizing plate and said base plate in positions parallel to and symmetrical with respect to the medial radial plane of said equalizing plate, said roller bearing elements providing an instantaneous center of rotation for said equalizing plate which is displaced both laterally and axially when unbalanced forces are applied to said equalizing plate.

22. In a thrust bearing, a plurality of thrust bearing members, means for equalizing the pressure on said bearing members and a base plate on which said equalizing means is mounted, said equalizing means comprising a plurality of equalizing plates on which the respective bearing members are mounted, a plurality of intermediate equalizing plates bridged by said first named equalizing plates and on which said first named equalizing plates are mounted to form therewith a circumferentially flexible equalizing structure, roller bearing elements disposed between the adjacent ends of contiguous equalizing plates, said roller bearing elements being disposed in grooves in said equalizing plates having radii of curvature of substantially the same size as said roller bearing elements, and means for tiltably mounting each of said intermediate equalizing plates comprising a pair of roller bearing elements providing an instantaneous center of rotation therefor which lies substantially in the plane joining the centers of said first named roller bearing elements.

23. In a thrust bearing, a plurality of thrust bearing members, a base plate, an inverted channel-shaped cage ring mounted on said base plate and provided with apertures corresponding in number to said bearing members, equalizing means mounted in said cage ring and comprising a bridged series of tiltable equalizing plates, alternate equalizing plates supporting said bearing members through said apertures and intermediate equalizing plates being tiltably mounted on said base plate, said cage ring providing for ingress and egress of oil only through the clearances between the supporting means for said bearing members and the peripheries of said apertures whereby said equalizing plates may function as a dash pot in the event of vibratory displacement thereof.

24. In a thrust bearing, a plurality of thrust bearing members, a base plate, an inverted channel-shaped cage ring mounted on said base plate and provided with apertures corresponding in number to said bearing members, equalizing means mounted in said cage ring and comprising a bridged series of tiltable equalizing plates, alternate equalizing plates supporting said bearing members through said apertures and intermediate equalizing plates being tiltably mounted on said base plate, said base plate being secured to said channel-shaped cage ring to close the open side thereof and provide a closed unit in which said equalizing means may be assembled for movement into and out of the bearing structure.

25. In a thrust bearing, a plurality of thrust bearing member, a base plate, an inverted channel-shaped cage ring mounted on said base plate and provided with apertures corresponding in number to said bearing members, equalizing means mounted in said cage ring and comprising a bridged series of tiltable equalizing plates, alternate equalizing plates supporting said bearing members through said apertures and intermediate equalizing plates being tiltably mounted on said base plate, anti-friction means disposed between the contiguous overlapping ends of said equalizing plates, and means for tiltably mounting each equalizing plate supported on said base plate comprising anti-friction means cooperating with said base plate and equalizing plate to prevent circumferential displacement therebetween except within the predetermined limits of an equalizing movement.

26. In a thrust bearing, a plurality of thrust bearing members, a base plate, an inverted channel-shaped cage ring mounted on said base plate and provided with apertures corresponding in number to said bearing members, equalizing means mounted in said cage ring and comprising a bridged series of tiltable equalizing plates, alternate equalizing plates supporting said bearing members through said apertures and intermediate equalizing plates being tiltably mounted on said base plate, roller bearing elements disposed in opposed grooves in the overlapping ends of contiguous equalizing plates, and a pair of roller bearing elements disposed in opposed grooves in said base plate and each equalizing plate mounted thereon.

27. In a thrust bearing, a plurality of thrust bearing members, a base plate, an inverted channel-shaped cage ring mounted on said base plate and provided with apertures corresponding in number to said bearing members, equalizing means mounted in said cage ring and comprising a bridged series of tiltable equalizing plates, alternate equalizing plates supporting said bearing members through said apertures and intermediate equalizing plates being tiltably mounted on said base plate, roller bearing elements disposed in opposed grooves in the overlapping ends of contiguous equalizing plates, and roller bearing elements disposed in opposed grooves in said base plate and each equalizing plate mounted thereon, said last named roller bearing elements providing an instantaneous center of rotation for the associated equalizing plate which lies substantially in the radial medial plane of said equalizing plate.

28. In a thrust bearing, a plurality of thrust bearing members, a base plate, an inverted channel-shaped cage ring mounted on said base plate and provided with apertures corresponding in number to said bearing members, equalizing means mounted in said cage ring and comprising a bridged series of tiltable equalizing plates, alternate equalizing plates supporting said bearing members through said apertures and intermediate equalizing plates being tiltably mounted on said base plate, roller bearing elements disposed in opposed grooves in the overlapping ends of contiguous equalizing plates, and roller bearing elements disposed in opposed grooves in said base plate and each equalizing plate mounted thereon, said last named roller bearing elements providing an instantaneous center of rotation for the associated equalizing plate which lies substantially in the radial medial plane of said equalizing plate and in the plane connecting the centers of said first named roller bearing elements.

ALBERT KINGSBURY.